United States Patent
Wesley et al.

(10) Patent No.: US 12,410,925 B2
(45) Date of Patent: Sep. 9, 2025

(54) AIR PURIFIER AND AIR PURIFIER ACCESSORY

(71) Applicant: BISSELL Inc., Grand Rapids, MI (US)

(72) Inventors: Mitchell J. Wesley, Grand Rapids, MI (US); Derek Smith, Greenville, MI (US); Habib Baydoun, Dearborn Heights, MI (US)

(73) Assignee: BISSELL Inc., Grand Rapids, MI (US)

( * ) Notice: Subject to any disclaimer, the term of this patent is extended or adjusted under 35 U.S.C. 154(b) by 456 days.

(21) Appl. No.: 18/095,548

(22) Filed: Jan. 11, 2023

(65) Prior Publication Data

US 2023/0221019 A1    Jul. 13, 2023

Related U.S. Application Data

(60) Provisional application No. 63/308,640, filed on Feb. 10, 2022, provisional application No. 63/298,312, filed on Jan. 11, 2022.

(51) Int. Cl.
| | |
|---|---|
| *F24F 8/10* | (2021.01) |
| *F24F 8/108* | (2021.01) |
| *F24F 13/06* | (2006.01) |
| *F24F 13/20* | (2006.01) |
| *B01D 46/00* | (2022.01) |
| *B01D 46/24* | (2006.01) |

(52) U.S. Cl.
CPC .............. *F24F 8/108* (2021.01); *F24F 13/06* (2013.01); *F24F 13/20* (2013.01); *B01D 46/0005* (2013.01); *B01D 46/0047* (2013.01); *B01D 46/2411* (2013.01); *F24F 2013/0616* (2013.01)

(58) Field of Classification Search
CPC .. F24F 8/108; F24F 13/06; F24F 13/20; F24F 2013/0616; F24F 8/10; F24F 8/80; F24F 13/28; B01D 46/0005; B01D 46/0047; B01D 46/2411
See application file for complete search history.

(56) References Cited

U.S. PATENT DOCUMENTS

| | | | | |
|---|---|---|---|---|
| 5,753,000 | A * | 5/1998 | Chiu | F24F 8/108 |
| | | | | 55/357 |
| 6,053,968 | A * | 4/2000 | Miller | F24F 8/22 |
| | | | | 96/16 |
| 9,579,597 | B2 * | 2/2017 | Gruenbacher | B01D 46/02 |
| 10,926,210 | B2 * | 2/2021 | Aries | F24F 13/06 |
| 11,717,782 | B2 * | 8/2023 | Oh | F04D 29/626 |
| | | | | 55/467 |
| 12,134,072 | B2 * | 11/2024 | Hoyda | B01D 53/346 |

(Continued)

FOREIGN PATENT DOCUMENTS

| | | | |
|---|---|---|---|
| CN | 205570092 U | * 9/2016 | |
| CN | 107388405 A | * 11/2017 | ............... F24F 8/10 |

(Continued)

*Primary Examiner* — Stephen Hobson
(74) *Attorney, Agent, or Firm* — Warner Norcross + Judd LLP (57) ABSTRACT

An air purifier and air purifier accessory for inside air. The air purifier includes a housing and an air outlet. The air purifier accessory is disposed on the air outlet. The air purifier accessory includes a frame containing a filter media, the frame adapted to be mounted at least partially over the air outlet of the air purifier to filter air discharged from the air purifier.

21 Claims, 10 Drawing Sheets

(56) References Cited

U.S. PATENT DOCUMENTS

| | | | | |
|---|---|---|---|---|
| 2014/0150658 A1* | 6/2014 | Prax | ............... | B01D 46/0002 96/74 |
| 2014/0331859 A1* | 11/2014 | Gruenbacher | ......... | F24F 13/28 95/26 |
| 2015/0114233 A1* | 4/2015 | Lee | ............... | F24F 6/06 261/114.5 |
| 2017/0122596 A1* | 5/2017 | Lee | ............... | F24F 11/30 |
| 2017/0122602 A1* | 5/2017 | Son | ............... | F24F 6/04 |
| 2017/0138616 A1* | 5/2017 | Wang | ............... | F24F 1/029 |
| 2017/0153040 A1* | 6/2017 | Wang | ............... | F24F 13/28 |
| 2019/0107302 A1* | 4/2019 | Liu | ............... | F24F 8/10 |
| 2019/0137124 A1* | 5/2019 | Mcgarva | ............ | F24F 13/0272 |
| 2019/0301756 A1* | 10/2019 | Luo | ............... | F24F 8/30 |
| 2019/0308122 A1* | 10/2019 | Aries | ............... | F24F 13/06 |
| 2020/0158357 A1* | 5/2020 | Son | ............... | F04D 25/166 |
| 2020/0224892 A1* | 7/2020 | Yang | ............... | F24F 1/029 |
| 2020/0289968 A1* | 9/2020 | Scholten | ............ | B01D 46/0009 |
| 2020/0298157 A1* | 9/2020 | Kang | ............... | B01D 46/4227 |
| 2020/0298160 A1* | 9/2020 | Jeon | ............... | B01D 46/58 |
| 2020/0298161 A1* | 9/2020 | Jeon | ............... | B01D 46/0008 |
| 2020/0298167 A1* | 9/2020 | Jeon | ............... | B01D 46/0013 |
| 2020/0298168 A1* | 9/2020 | Lee | ............... | B01D 46/46 |
| 2020/0300485 A1* | 9/2020 | Kang | ............... | B01D 46/4245 |
| 2020/0300502 A1* | 9/2020 | Kang | ............... | F24F 13/20 |
| 2020/0355191 A1* | 11/2020 | Park | ............... | F04D 17/16 |
| 2021/0086219 A1* | 3/2021 | Hsiao | ............... | B08B 3/08 |
| 2021/0172626 A1* | 6/2021 | Jung | ............... | F04D 25/08 |
| 2021/0278097 A1* | 9/2021 | Min | ............... | F24F 13/20 |
| 2021/0325057 A1* | 10/2021 | Gong | ............... | F24F 3/16 |
| 2021/0372640 A1* | 12/2021 | Yang | ............... | F24F 6/04 |
| 2021/0381518 A1* | 12/2021 | Horton | ............... | F04D 25/10 |
| 2022/0011009 A1* | 1/2022 | Lee | ............... | F24F 13/20 |
| 2022/0011011 A1* | 1/2022 | Yang | ............... | F24F 13/082 |
| 2022/0023789 A1* | 1/2022 | Oh | ............... | B01D 46/0002 |
| 2022/0032222 A1* | 2/2022 | Park | ............... | F24F 13/10 |
| 2022/0032224 A1* | 2/2022 | An | ............... | B01D 46/0005 |
| 2022/0184542 A1* | 6/2022 | Kim | ............... | F24F 8/108 |
| 2022/0184543 A1* | 6/2022 | Choi | ............... | B01D 46/0049 |
| 2022/0235956 A1* | 7/2022 | Huang | ............... | F24F 13/20 |
| 2022/0275955 A1* | 9/2022 | Dunberger | ............ | F24F 13/20 |
| 2023/0071996 A1* | 3/2023 | Yang | ............... | F24F 8/108 |
| 2023/0073213 A1* | 3/2023 | Yang | ............... | A61L 9/16 |
| 2023/0152000 A1* | 5/2023 | Ha | ............... | F24F 13/28 95/273 |
| 2023/0158435 A1* | 5/2023 | Ha | ............... | F24F 8/108 55/411 |
| 2023/0366571 A1* | 11/2023 | Smith | ............... | B01D 46/103 |
| 2023/0381704 A1* | 11/2023 | Smith | ............... | B01D 46/0047 |
| 2024/0017195 A1* | 1/2024 | Mani | ............... | F24F 8/80 |
| 2024/0017199 A1* | 1/2024 | Lee | ............... | F24F 8/10 |
| 2024/0019139 A1* | 1/2024 | Wesley | ............... | B01D 46/0027 |
| 2024/0108773 A1* | 4/2024 | Kim | ............... | G05D 1/246 |
| 2024/0216863 A1* | 7/2024 | Liu | ............... | B01D 53/869 |
| 2024/0426489 A1* | 12/2024 | Chen | ............... | F24F 13/20 |

FOREIGN PATENT DOCUMENTS

| | | | | | |
|---|---|---|---|---|---|
| CN | | 109140620 A | * | 1/2019 | ............... F24F 8/10 |
| CN | | 109173600 A | * | 1/2019 | ............... B01D 50/60 |
| CN | | 109595712 A | * | 4/2019 | ............... F24F 11/32 |
| CN | | 112325438 A | * | 2/2021 | ............... F24F 13/28 |
| CN | | 116045434 A | * | 5/2023 | ............... F24F 8/80 |

* cited by examiner

AIR PURIFIER AND AIR PURIFIER ACCESSORY

CROSS-REFERENCE TO RELATED APPLICATIONS

The present application claims the benefit of U.S. Provisional Patent Application No. 63/298,312, filed Jan. 11, 2022, and U.S. Provisional Patent Application No. 63/308,640, filed Feb. 10, 2022, both of which are incorporated herein by reference in their entirety.

BACKGROUND

Air purifying devices filter particles from inside air and/or kill airborne pathogens. Such devices typically use filters or ion injectors to purify the air surrounding the device. Yet there are continual issues in operation, function, and ornamental appearance that remain unresolved.

Current air purifiers often lack an amount of filter media sufficient to remove odors from the air. This is especially true for smaller air purifying units that have minimal space in the interior of the housing. These units often have combined media types stored in the interior of the unit. Typically, the filter media is on the inlet side of the air flowing through the interior of the air purifier housing. Because of the limited space, a limited amount of odor absorbing and/or eliminating filter media can be used in conjunction with HEPA filters. For example, often, odor removing media is in a mesh form or it is woven into the HEPA media in trace amounts, neither of which is significant enough to sufficiently capture, absorb, or remove odor causing volatile organic compounds (VOCs), especially in a concentrated odor environment, such as in pet areas or near diaper pails. Typically, granules or pellets of odor removing media function optimally in this environment, however, using granules or pellets on the interior of the housing significantly reduces the airflow through the air purifier and thus, not enough air is being cleaned and/or purified through the unit to remove the odors.

BRIEF DESCRIPTION

An air purifier and air purifier accessory with improved ability to capture, absorb, and/or remove odor causing volatile organic compounds (VOCs) from inside air is provided herein. Aspects of the disclosure relate to an improved outlet or exhaust accessory that is adapted to be mounted on the air outlet of an air purifier to remove odors from the air.

An air purifier accessory includes frame containing a filter media, the frame adapted to be mounted at least partially over the air outlet of the air purifier.

In one aspect of the disclosure, an air purifier assembly includes an air purifier and an air purifier accessory. The air purifier includes a housing having a longitudinal axis, an air flow path through the housing including an air inlet and an air outlet, a blower disposed within the housing, the blower defining a portion of the air flow path and adapted to pull air in through the air inlet and to push air outlet out of the air outlet, and an air treatment device disposed within the housing to treat air flowing through the air flow path. The air purifier accessory, which can be disposed on the air outlet, outside of the housing, to treat air flowing out of the air outlet, includes a frame, a filter media within the frame for filtering air discharged from the air purifier, at least one air inlet on an inflow side of the frame, a plurality of air outlets on an outflow side of the frame, wherein the outflow side of the frame is perpendicular to the inflow side of the frame, and an air deflector configured to deflect the air to be filtered as it flows through the frame, the air deflector defining a closed area within the frame in which air does not flow and an open area within the frame in which air flows, wherein air exiting the air purifier flows axially into the open area through the inflow side of the frame and flows radially out of the open area through the outflow side of the frame.

In another aspect of the disclosure, an air purifier accessory includes a frame adapted to be coupled to an exterior of an air purifier and defining an longitudinal axis, a filter media within the frame for filtering air discharged from the air purifier, at least one air inlet on an inflow side of the frame, a plurality of air outlets on an outflow side of the frame, wherein the outflow side of the frame is perpendicular to the inflow side of the frame, and an air deflector configured to deflect the air to be filtered as it flows through the frame, the air deflector defining an open area within the frame in which air flows, wherein air exiting the air purifier flows axially into the open area through the inflow side of the frame and flows radially out of the open area through the outflow side of the frame.

These and other features and advantages of the present disclosure will become apparent from the following description of particular embodiments, when viewed in accordance with the accompanying drawings and appended claims.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. In addition, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DETAILED DESCRIPTION

Aspects of the disclosure relate to an air purifier and/or an air purifier accessory. While primarily discussed herein in terms of an air purifier for indoor air, aspects of the filter accessory and embodiments thereof disclosed herein are applicable to other types of air filtration apparatus.

The term "clean" as used herein is to describe the removal of pollutants from air as compared to the ambient air. Pollutants can include dirt, dust, volatile organic compounds (VOCs), biological contaminants (e.g., bacteria, viruses, mold spores, waste products, etc.), soot particles, and any other pollutants that can be found in indoor and/or outdoor flows.

The term "purify" is used herein to describe killing or inactivating biological contaminants, pathogens, or microorganisms in the ambient air. It is noted that the air purifier apparatus can have a variety of applications including commercial or home based application.

As used herein, the term "upstream" refers to a direction that is opposite the air flow direction, and the term "downstream" refers to a direction that is in the same direction as the air flow. Additionally, as used herein, the terms "radial" or "radially" refer to a direction away from a common center. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order, and relative sizes reflected in the drawings attached hereto can vary.

Figure 1:
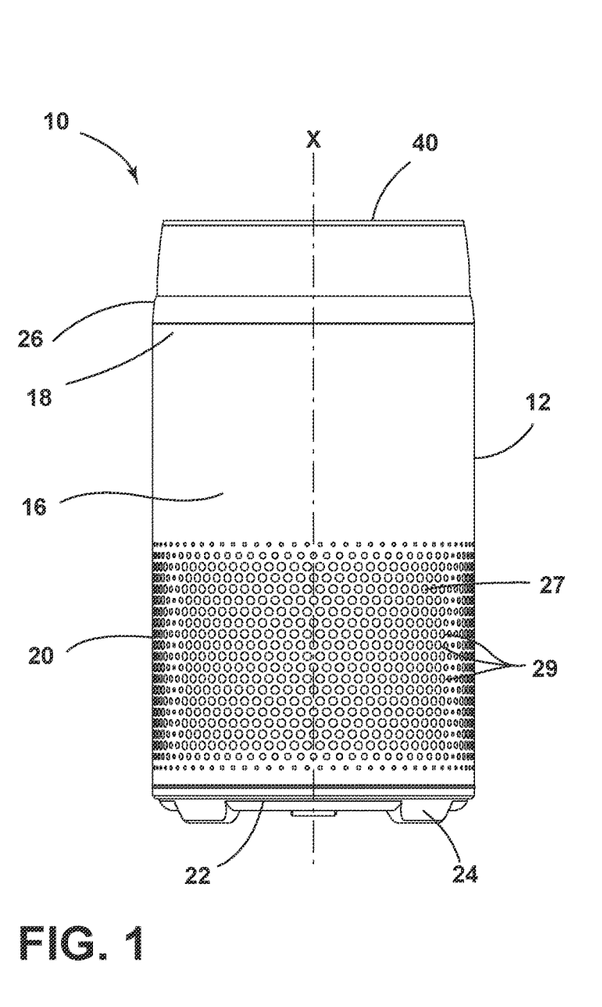
FIG. 1 is a perspective view of an air purifier with an air purifier accessory according to various aspects described herein.
Figure 2:
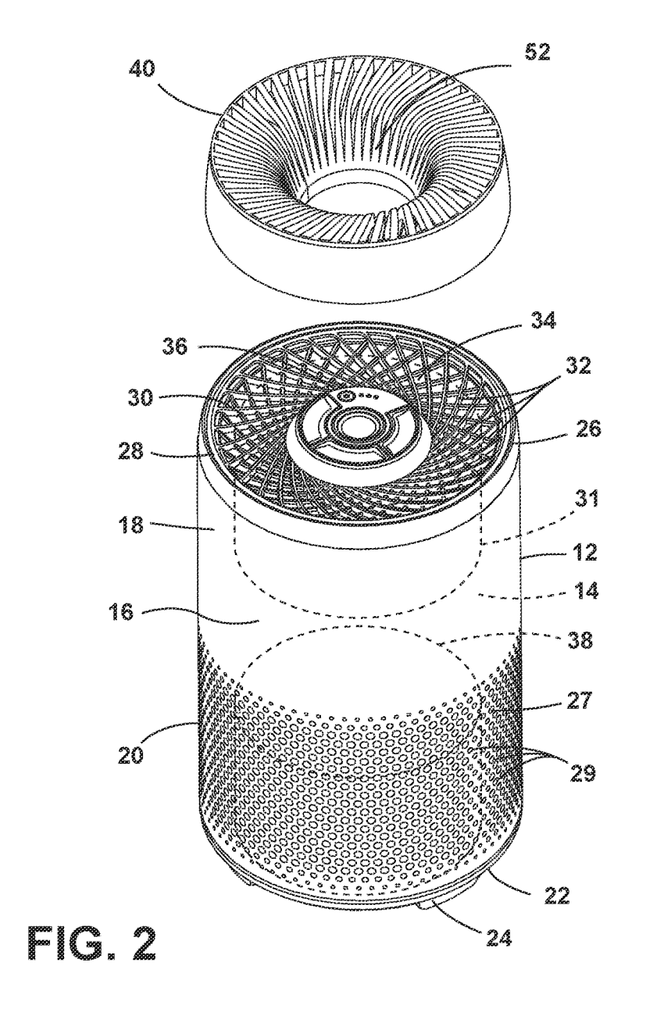
FIG. 2 is a perspective view of the air purifier of FIG. 1, with the air purifier accessory exploded from a housing of the air purifier.

FIGS. 1-2 illustrate an air purifier 10 including a housing 12 having a longitudinal axis X. An air flow path through the housing 12 includes an air inlet 27 and an air outlet 30. An air treatment device 38 is disposed within the housing 12 to filter, clean, and/or purify air flowing through the air flow path. A blower 31 can define a portion of the air flow path and is disposed within the housing 12. An air purifier accessory 40 is disposed on the air outlet 30, outside of the housing 12, to filter, clean, and/or purify air flowing out of the air outlet 30. The air purifier accessory 40 is therefore disposed downstream of the air treatment device 38, blower 31, and air outlet 30. The air purifier 10 and accessory 40 can form an assembly.

An interior 14 of the air purifier 10 can at least partially be defined by the housing 12. The housing 12 defines an exterior periphery 16 for the air purifier 10. The housing 12 can further define an upper portion 18 and a lower portion 20. The upper portion 18 and the lower portion 20 can divide the housing 12 in half vertically. However, it is contemplated that the upper portion 18 can be greater than or less than half of the housing 12, with the lower portion 20 defining the remaining portion of the housing 12. The lower portion 20 can be adapted to rest on a surface, with the upper portion 18 spaced from the surface on which the lower portion 20 rests. The lower portion 20 can include a base 22. Optionally, the base 22 can include legs 24 or other supporting structures.

The air treatment device 38 and blower 31 are disposed within the interior 14 of the air purifier 14. By way of non-limiting example, the air treatment device 38 can include a filter, an ion injector, or any combination thereof, and including multiples thereof. By way of non-limiting example, the blower 31 can include a fan and a motor to drive the fan. While the motor is energized, air is pulled in through the air inlet 27 and pushed out of the air outlet 30 by the fan.

In the embodiment shown, the blower 31 is disposed in the upper portion 18 of the housing and the air treatment device 38 is disposed in the lower portion 20 of the housing 12, generally below the blower 31. Other spatial arrangements are possible. The blower 31 is preferably disposed downstream of the air treatment device 38 within the air flow path, regardless of the spatial arrangement of the components.

The air inlet 27 can be provided in various locations and configurations on the housing 12. By way of non-limiting example, the air inlet 27 can include a plurality of perforations 29 in the lower portion 20 of the housing 12. The plurality of perforations 29 can be included on one or any number of sides of the housing 12. The plurality of perforations 29 can be generally uniform in size and shape, or may have a variety of sizes and shapes.

The housing 12 can be a monolithic body, e.g., a single body that is a single, non-separable piece, or formed as a single unitary piece at manufacture, as opposed to being formed by combining separate elements into one during manufacture. Alternatively, the housing 12 can be defined by more than one component coupled together. The shape of the housing 12, as illustrated by way of example is a cylinder having a base or cross-sectional shape that is a circle, however it is contemplated that the housing 12 can be any shape, such as, but not limited to, a prism, having a base or cross-sectional shape that is a squircle (e.g., a shape intermediate between a square and a circle), a round rectangular prism having a base or cross-sectional shape that is a rounded rectangle or a square, or an elliptic cylinder having a cross-sectional shape that is an ellipse or oval.

A top portion 26 of the housing 12 is illustrated as being provided adjacent the upper portion 18. A lip or ledge 28 can define a perimeter of the top portion 26. The ledge 28 can be uniformly formed with the housing 12 or be a separate component of the housing 12. In the illustrated example, and by way of non-limiting example the top portion 26 has a similar shape to a cross-section of the housing 12. That is, the top portion 26 is generally shaped as a circle, although this need not be the case. That is, the housing 12 can have a cross-section similar in shape to the top portion 26; alternatively, the top portion 26 can have a different shape or be a different size than a cross-section of the housing 12.

The ledge 28 can generally shaped as a circle, or can otherwise have a cross-section similar in shape to a cross-section of the housing 12. Alternatively, the ledge 28 can have a different shape or be a different size than a cross-section of the housing 12.

The air outlet 30 can be provided in various locations and configurations on the housing 12. By way of non-limiting example, the air outlet 30 can be provided in within the top portion 26 of the housing 12, and is shown herein as a vent. The vent can include a plurality of flow diverters 32, which define a plurality of openings 34 therebetween. While illustrated generally as radially extending vanes, the flow diverters 32 can be any shape, size, profile, spacing, or orientation. Further, the flow diverters 32 can be defined by two or more pieces or components. Other configurations for the air outlet 30 are possible.

A user interface 36 can be provided with the top portion 26 of the housing 12. More specifically, the user interface 36 can be located at an upper surface of the air purifier 10, although this need not be the case and the user interface 36 can be provided at any suitable location. It is contemplated, however, that the user interface 36 can be located on one or more sides of the housing 12. In the non-limiting illustrated example, the user interface 36 can be operably coupled to the housing 12. This can include, but is not limited to, being mounted to or formed with the housing 12. Further still, while a single user interface 36 is shown, it is further contemplated that the air purifier 10 can include more than one user interface. Optionally, the air purifier 10 can be remotely controlled by one or more electronic devices such as, but not limited to, a handheld remote or a cellular phone. The user interface 36 can include or be couple to a controller (not shown). The user interface 36 can include various features including, but not limited to, indicator lights providing information about the air purifier 10 to the user and/or buttons that adjust one or more settings or monitor the status of one or more components of the air purifier 10.

The air purifier 10 can be powered by an external power supply, such as a household power supply, or by an internal power supply, such as a battery pack.

The air purifier 10 includes an air purifier accessory 40 on the air outlet 30, outside of the air purifier housing 12. The air purifier accessory 40 avoids the space and airflow constraints of prior configurations. The accessory 40 is positioned directly on the air outlet 30 of the purifier 10. Once the filter media is fully saturated, the accessory 40 can be discarded and replaced. In one aspect, the accessory 40 is a disposable consumable article.

The air purifier accessory 40 can be configured to contain any amount and/or type of filter media required for a specific odor rich area. For example, the air purifier accessory 40 can contain activated carbon pellets used to adsorb VOCs and mixed with Zeolites specific to ammonia removal to more effectively remove cat litter odors from a litter box area.

In some embodiments, the air purifier accessory 40 is removable from the air purifier 10. In being removable, i.e. not an integrated part of the purifier 10, the accessory 40 can be removed and replaced as needed. For example, once the filter media is fully saturated, the accessory 40 can be removed for replacement of the saturated filter media with new filter media. Also, a user can customize the filter media inside the accessory 40 depending on the specific odor to address. Users benefit from both the effective odor removal and the customizability of the filter media to meet their odor removal requirements.

As noted above, in some embodiments, the accessory 40 can be a replenished with a new filter media. Alternatively, the accessory 40 can be configured as a disposable component, with the accessory 40 being disposed of when saturated and replaced with a new accessory. Where the accessory 40 or a portion thereof is configured for disposal after use, recyclable, biodegradable and/or compostable material, or combinations thereof, may be used to manufacture the accessory 40.

The air purifier accessory 40 is provided on the top portion 26 of the air purifier 10 and covers the air outlet 30 such that all air flowing out of the housing 12 passes through the air purifier accessory 40. The air purifier accessory 40 can be removable, press fit, fastened, snap fit, or permanently affixed to the air purifier 10.

Figure 3:
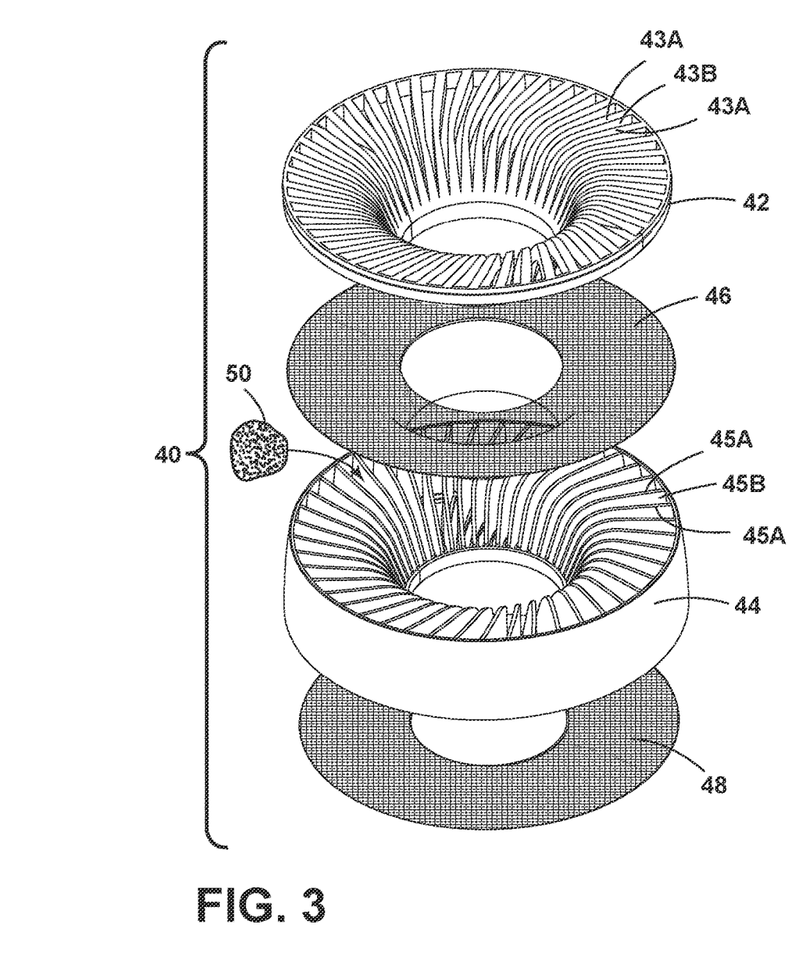
FIG. 3 is an exploded view of the air purifier accessory of FIG. 1.
Figure 4:
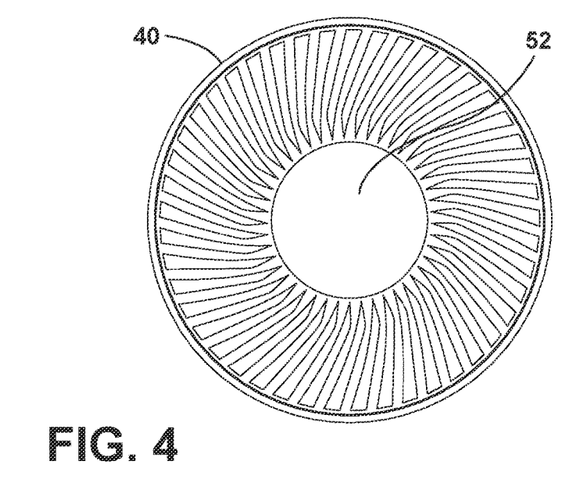
FIG. 4 is a top view of the air purifier accessory of FIG. 1.
Figure 5:
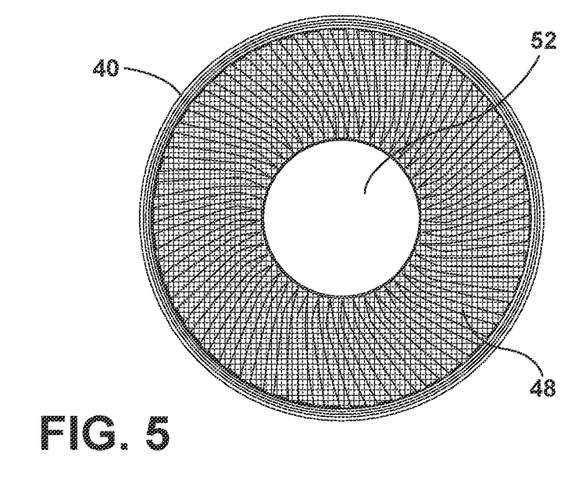
FIG. 5 is a bottom view of the air purifier accessory of FIG. 1.

FIG. 3 is an exploded view of the air purifier accessory 40. The air purifier accessory 40 comprises a frame including an upper housing 42 and a lower housing 44. An upper mesh 46 is disposed between the upper housing 42 and the lower housing 44 and a lower mesh 48 is disposed beneath the lower housing 44. The housings 42, 44 may be plastic components manufactured via molding or other suitable method, and may be snapped, screwed, or otherwise secured together. The mesh 46, 48 can be formed from a fine metal mesh, or from other suitable mesh.

A filter media 50 is contained by the frame. The filter media 50 is configured to remove odors from the air being exhausted from the air purifier 10 via the outlet 30, and may capture, absorb, and/or remove odor-causing VOCs. In certain embodiments, the filter media 50 is chosen from carbon, zeolite (understood to include at least zeolite X, zeolite Y, ultrastable zeolite Y, ZSM zeolite, offretite, and beta zeolite, among others), silica gel, faujasite, chabazite, clinoptilolite, mordenite, silicalite, metal organic frameworks, metal oxide, polymers, resins, and combinations thereof. In one embodiment, the filter media 50 is activated carbon pellets mixed with zeolites specific to ammonia removal.

It is noted that in FIG. 3, only a portion of filter media 50 is shown for illustration purposes. The filter media 50 can substantially fill the open space in the lower housing 44 between the upper and lower mesh 46, 48. Alternatively, the filter media 50 can fill less than all of the open space, for example by being disposed on a radially interior portion or a radially exterior portion, in order to leave some open space unfilled.

The lower housing 44 and/or lower mesh 48 can form an air inlet side or inflow side of the accessory 40 and the upper housing 42 and/or upper mesh 46 can form an air outlet side or outflow side of the accessory 40.

Each housing 42, 44 and mesh 46, 48 can have openings for air to pass with the housings 42, 44 having larger openings and the mesh 46, 48 having finer openings. The mesh 46, 48 can prevent the odor media 50 from falling through the large openings of the housings 42, 44.

The housings 42, 44 can include a plurality of flow diverters 43A, 45A, which define their respective openings 43B, 45B therebetween. While illustrated generally as radially extending vanes, the flow diverters 43A, 45A can be any shape, size, profile, spacing, or orientation. Further, the flow diverters 43A, 45A can be defined by two or more pieces or components. Other configurations for the housings 42, 44 are possible.

The accessory 40 can optionally include an access opening 52 in the center to allow access to the user interface 36 (FIG. 2). The access opening 52 can be formed by concentric openings in each of the housings 42, 44 and mesh 46, 48, such that a center area of the accessory 40 is clear and the user interface 36 is accessible when the accessory 40 is placed on the air outlet 30 of the purifier 10.

The overall shape of accessory 40, as illustrated by way of example is a cylinder having a base or cross-sectional shape that substantially matches that of the housing 12, so that the accessory 40 is harmonious with the exterior periphery 16 of the purifier 10. However, it is contemplated that the accessory 40 can be any shape, including shapes that differ from the shape of the housing 12.

Figure 6:
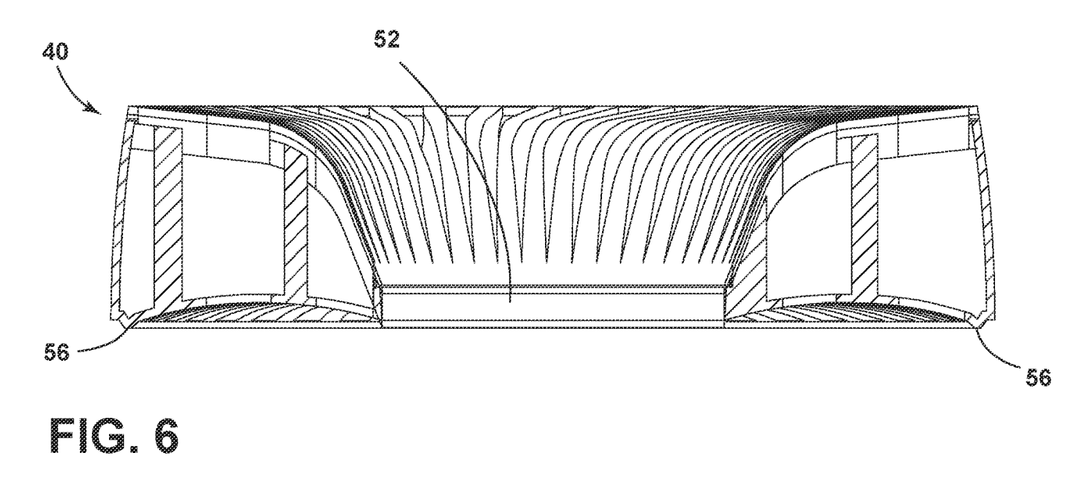
FIG. 6 is a cross-sectional view through the air purifier accessory of FIG. 1.

FIG. 6 is a cross-sectional view through the air purifier accessory 40, where the mesh and 46, 48, and media 50 are not shown for clarity. The accessory 40 can have an extending portion 56 that is at least partially received in the top portion 26 of the air purifier 10 (FIG. 1), for example such that the extending portion 56 is disposed inwardly of the lip or ledge 28. Yet other physical features for aligning the accessory 40 on the air purifier 10 are possible. In one non-limiting example, the alignment features can be configured to align the flow diverters 45A on the outlet side of the accessory 40 with the flow diverters 32 of the air purifier outlet 30 to limit air flow restriction.

Figure 7:
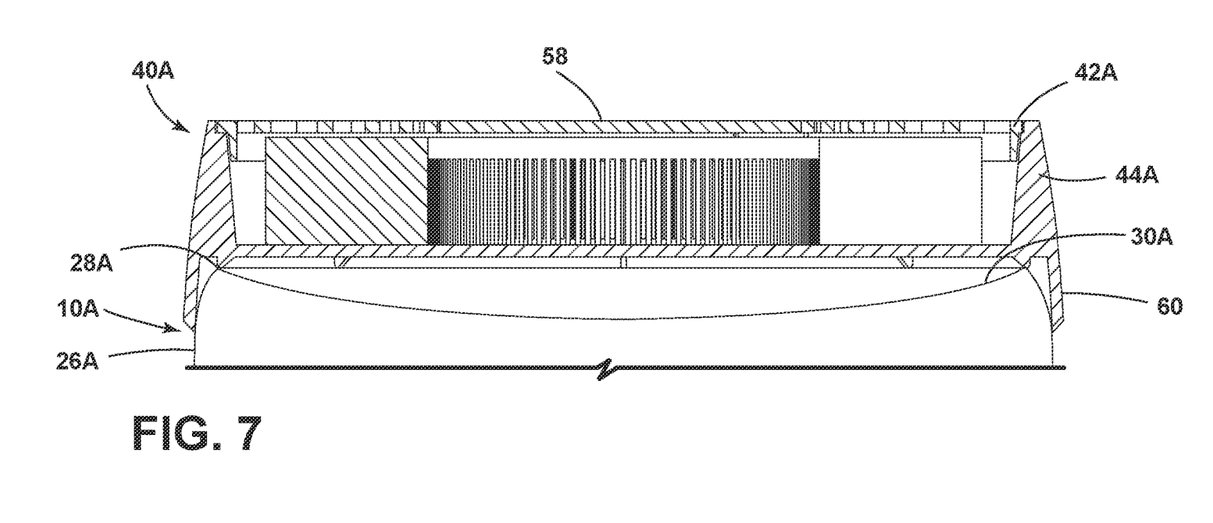
FIG. 7 is a cross-sectional view through an upper portion of an air purifier an air purifier accessory according to another aspect of the disclosure.

FIG. 7 is a cross-sectional view through an air purifier 10A and an air purifier accessory 40A according to another aspect of the disclosure. The air purifier 10A and air purifier accessory 40A are substantially similar to those of FIGS. 1-7, and like elements are referred to with the same reference numeral bearing a letter "A." The air purifier 10A differs by lacking a user interface located at an upper surface of the air purifier 10A. Accordingly, the accessory 40A does not need an access opening in the center, and can instead have a uniform surface 58 forming the upward facing surface of the assembled air purifier 10A and accessory 40A.

To mount the accessory 40A on the air purifier 10A, the accessory 40A can have a mounting flange 60 that extends downwardly from the lower housing 44A that overlaps the top portion 26A of the air purifier 10A. As such, the accessory 40A can be mounted without requiring any special structure on the air purifier 10A and the accessory 40A can be seated onto any complementary-shaped air purifier device. Alternatively, the accessory 40A can have the same mounting structure (e.g., groove and extending portion) as shown in FIG. 6.

Figure 8:
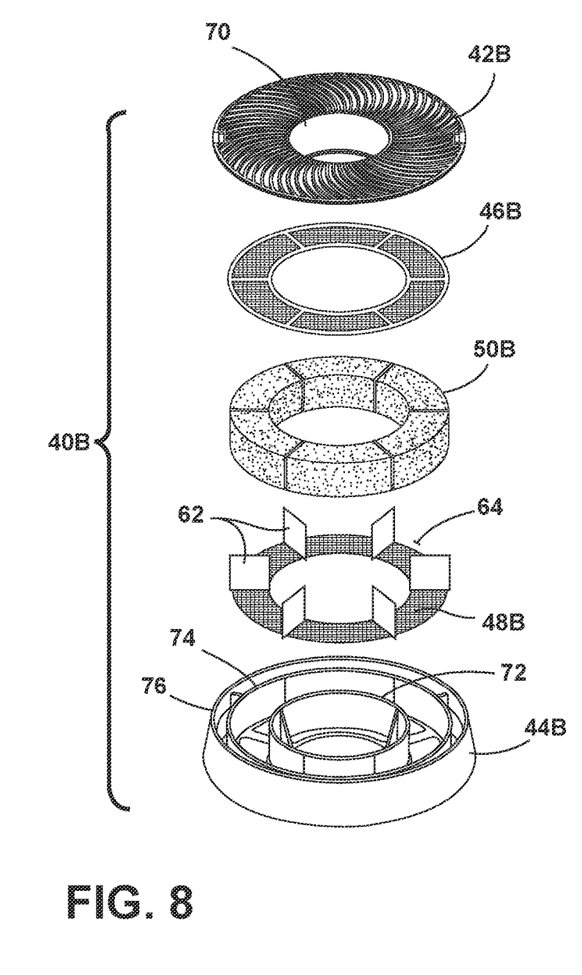
FIG. 8 is an exploded view of an air purifier accessory according to yet another aspect of the disclosure.
Figure 9:
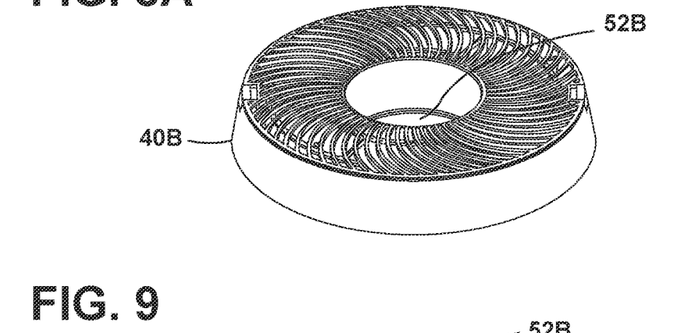
FIG. 9 is a top perspective view of the air purifier accessory of FIG. 8.
Figure 10:
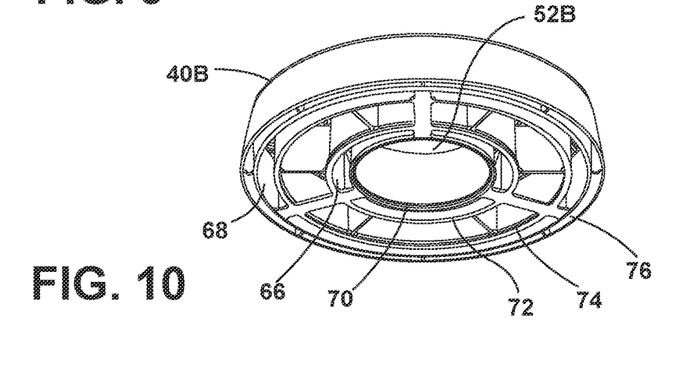
FIG. 10 is a bottom perspective view of the air purifier accessory of FIG. 8.

FIGS. 8-10 show an air purifier accessory 40B according to another aspect of the disclosure. The air purifier accessory 40B is substantially similar to that of FIGS. 1-7, and like elements are referred to with the same reference numeral bearing a letter "B." The air purifier accessory 40B includes a plurality of dividers 62 that create chambers 64 for the filter media 50B. These chambers 64 serve to prevent damage to the filter media 50B by minimizing shifting of the media 50B. In one embodiment, the lower mesh 48B can include the diverters 62. For example, the dividers 62 can be formed with or otherwise attached to the lower mesh 48B. The chambers 64 can further be defined by the upper mesh 46B and the lower housing 44B, with filter media 50B substantially filling each of the chambers 64.

The accessory 40B includes at least one air channel that allows air exiting the air purifier 10 (FIG. 1) to bypass the filter media 50B so as to not suffocate the air purifier 10. In the embodiment shown, an inner channel 66 and an outer channel 68 are provided and are disposed radially inwardly and radially outwardly, respectively of the filter medial 50B.

Various configurations for the channels 66, 68 are possible. In the embodiment shown, the inner channel 66 can be formed by a depending wall 70 of the upper housing 42B and a first wall 72 of the lower housing 44B that is spaced radially outwardly from the upper housing wall 70. The outer channel 68 can be formed by a second wall 74 of the lower housing 44B and a third wall 76 of the lower housing 44B that is spaced radially outwardly from the second wall 74.

The filter media 50B can be disposed between the first and second walls 72, 74. The filter media 50 can substantially fill the open space between the first and second walls 72, 74 in the lower housing 44B and between the upper and lower mesh 46B, 48B.

Figure 8A:
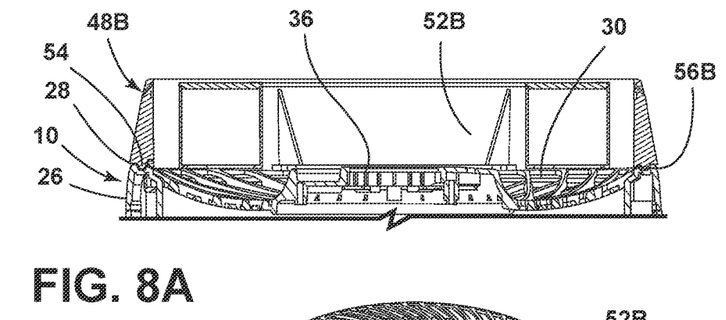
FIG. 8A is a cross-sectional view through an upper portion of the air purifier of FIG. 1 with the air purifier accessory of FIG. 8.

FIG. 8A is a cross-sectional view through the top portion 26 of the air purifier 10 and the air purifier accessory 40B. A groove 54 in the top portion 26 can function as a seat for the accessory 40B. The accessory 40B can have a corresponding extending portion 56B that is at least partially received in the groove 54. The groove 54 can be disposed inwardly of the lip or ledge 28. In other embodiments, the groove 54 can be provided in the accessory 40B and the extending portion 56B can be provided on the air purifier 10. Yet other physical features for aligning the accessory 40B on the air purifier 10 are possible.

Figure 11:
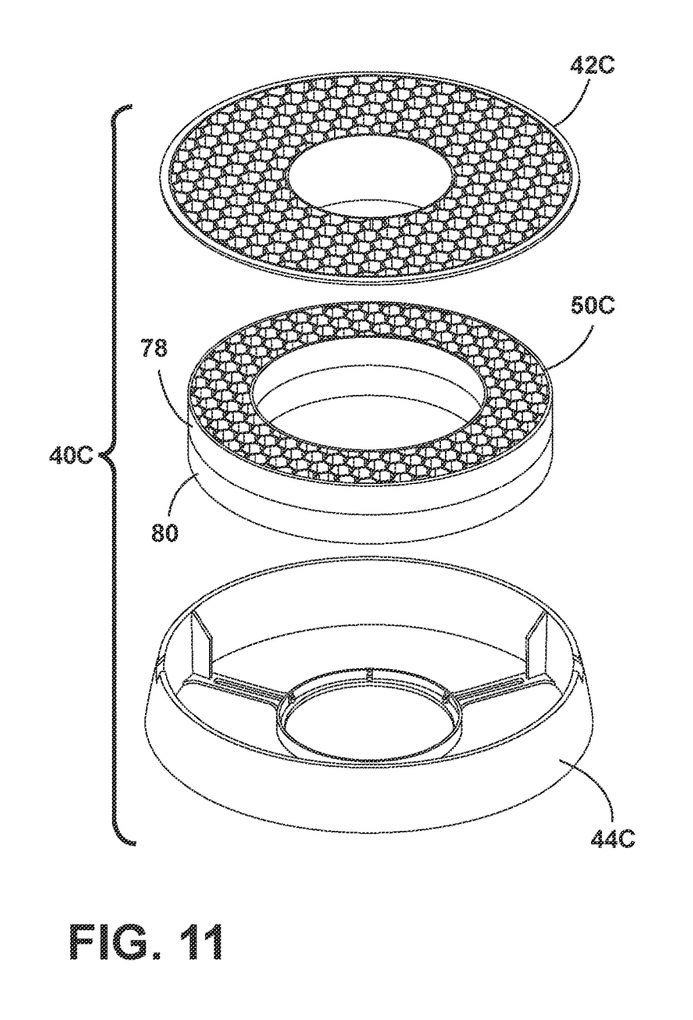
FIG. 11 is an exploded view of an air purifier accessory according to still another aspect of the disclosure.
Figure 12:
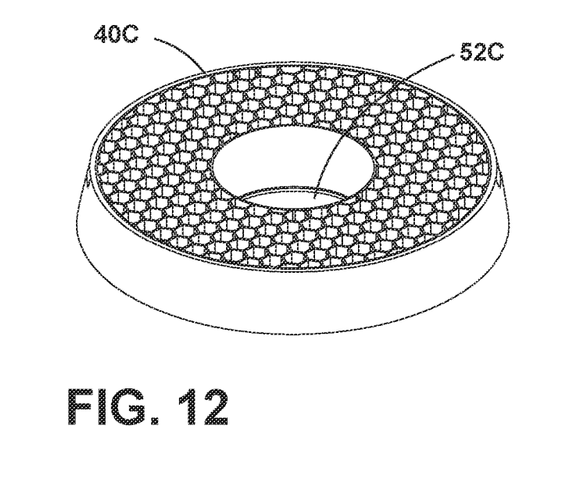
FIG. 12 is a top perspective view of the air purifier accessory of FIG. 11.
Figure 13:
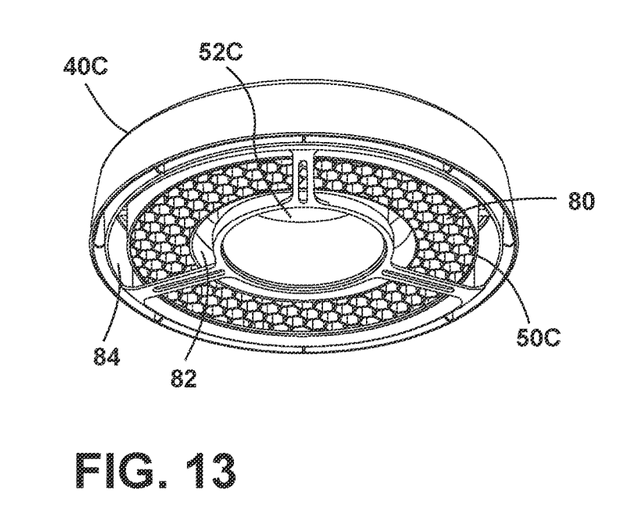
FIG. 13 is a bottom perspective view of the air purifier accessory of FIG. 11.

FIGS. 11-13 show an air purifier accessory 40C according to another aspect of the disclosure. The air purifier accessory 40C is substantially similar to that of FIGS. 1-7, and like elements are referred to with the same reference numeral bearing a letter "C." The accessory 40C has a dual-layer filter media 50C between the upper and lower housings 42C, 44C. The filter media 50C includes an upper filter layer 78 and a lower filter layer 80 that can be fused together or separate from each other. The layers 78, 80 can contain the same or different filter materials. In one embodiment, the upper layer 78 is a Zeolite filter and the lower layer 80 is a carbon filter.

While not shown, mesh can be disposed on the upper side of the filter media 50C, on the lower side of the filter media 50C, in between the layers 78, 80 of the filter media 50C, or any combination thereof.

The accessory 40C includes at least one air channel that allows air exiting the air purifier 10 (FIG. 1) to bypass the dual-layer filter media 50C so as to not suffocate the air purifier 10. In the embodiment shown, an inner channel 82 and an outer channel 84 are provided and are disposed radially inwardly and radially outwardly, respectively of the filter medial 50C.

Figure 14:
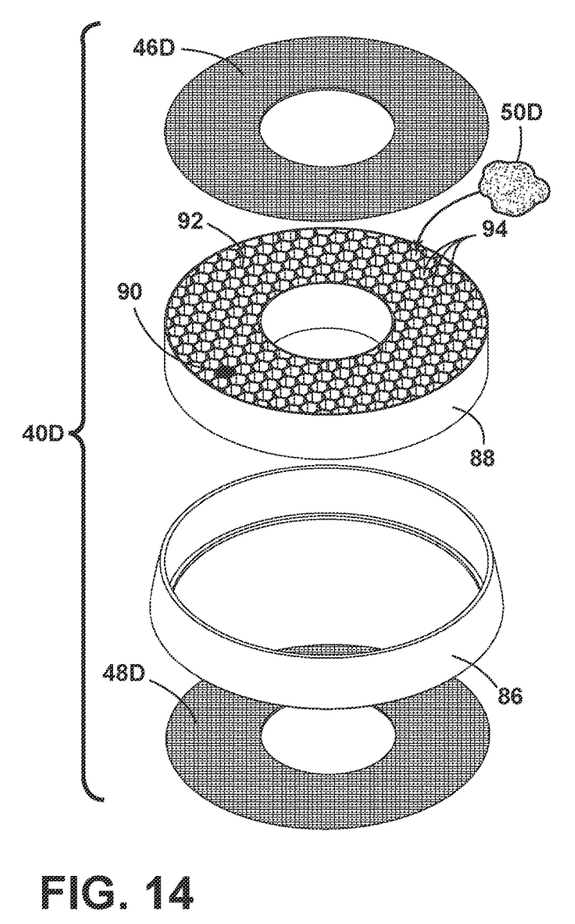
FIG. 14 is an exploded view of an air purifier accessory according to a further aspect of the disclosure.
Figure 15:
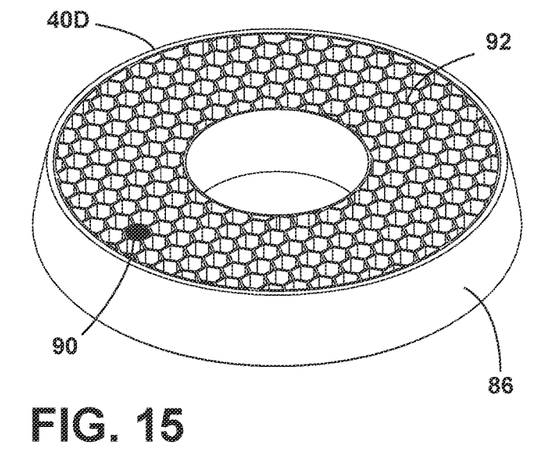
FIG. 15 is a top perspective view of the air purifier accessory of FIG. 14.
Figure 16:
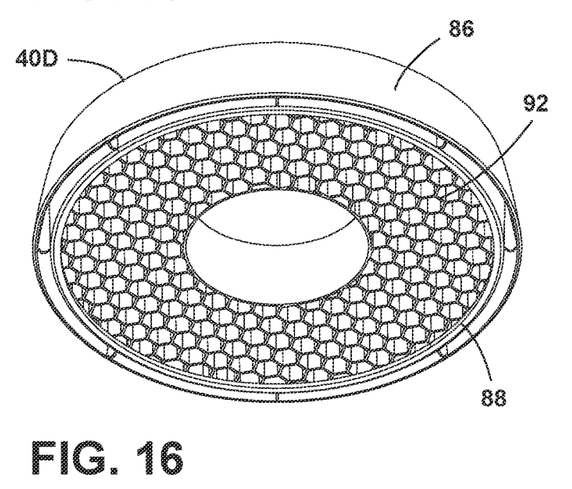
FIG. 16 is a bottom perspective view of the air purifier accessory of FIG. 14.

FIGS. 14-16 show an air purifier accessory 40D according to another aspect of the disclosure. The air purifier accessory 40D is substantially similar to that of FIGS. 1-7, and like elements are referred to with the same reference numeral bearing a letter "D." The accessory 40D includes a single housing or frame 86 with a press-fit insert 88 comprising the filter media 50D. The insert 88 can, for example be cardboard or another recyclable, biodegradable and/or compostable material, or combination of materials. Once the filter media 50D is fully saturated, the insert 88 can be removed from the frame 86 and replaced with a new insert.

The insert 88 can include a filter media matrix 92 defining a plurality of cells 94. In one embodiment, the matrix 92 can have a honeycomb configuration, with the cells 94 having a hexagonal shape. Other configurations for the matrix 92 and shape for the cells 94 are possible.

The filter media 50D can be disposed in at least some, alternatively all, of the cells 94. In one embodiment, at least some of the cells 94 can be empty, e.g. can lack filter media 50D, in order to allow some air to bypass the accessory 40D and limit air flow restriction. It is noted that in FIG. 14, only a portion of filter media 50D is shown for illustration purposes. The filter media 50D is not depicted in FIGS. 15-16 for clarity.

The matrix 92 be a plastic component manufactured via injection molding. After injection molding, the filter media 50D is added to the matrix 92, for example by filling at least some, alternatively all, cells 94 with a granulate, particulate, or pelletized filter media. Mesh 46D, 48D can be disposed on the upper and lower sides of the insert 88 to cover the matrix 92 and contain the filter media 50D within the matrix 92. The mesh 46D, 48D is not depicted in FIGS. 15-16 for clarity.

Optionally, the filter media 50D can include a replacement indicator 90. The replacement indicator can be disposed in one cell 94 of the matrix 92 or elsewhere on the insert 88, and changes color to indicator when to replace the insert 88. Advantageously, by positioning the replacement indicator 90 on the upward facing surface of the accessory 40D, a user can readily observe the color when passing by the air purifier, and is notified when replacement of the insert 88 is indicated. It is understood that a similar replacement indicator 90 can be applied to any embodiment of filter media or air purifier accessory disclosed herein.

In one embodiment, the replacement indicator 90 can include a media including a color-shifting chemisorptive coating commercially available as Colorfil™, and changes color as it captures chemicals and odors.

Figure 17:
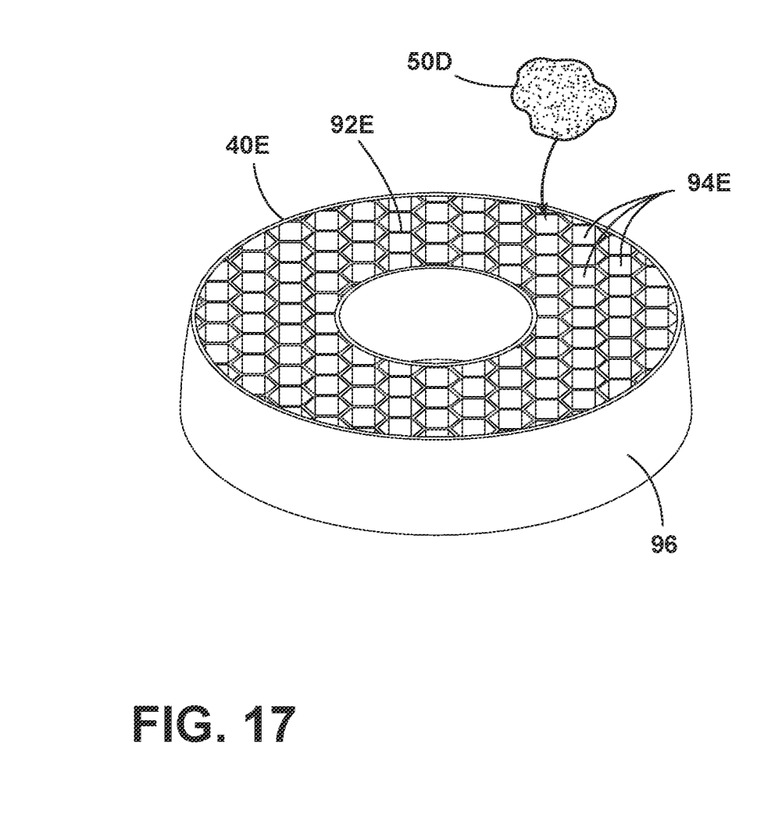
FIG. 17 is a top perspective view of an air purifier accessory according to yet a further aspect of the disclosure.
Figure 18:
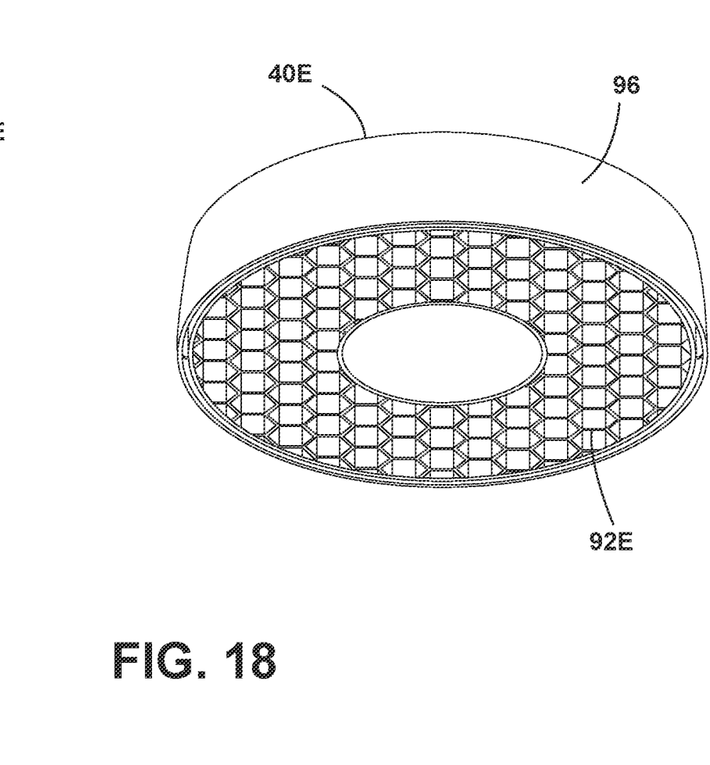
FIG. 18 is a bottom perspective view of the air purifier accessory of FIG. 17.

FIGS. 17-18 show an air purifier accessory 40E according to another aspect of the disclosure. The air purifier accessory 40E is substantially similar to that of FIGS. 14-16, and like elements are referred to with the same reference numeral bearing a letter "E." In this embodiment, the air purifier accessory 40E includes a one-piece frame 96 having the filter media matrix 92E. The frame 96 may be a plastic component manufactured via injection molding, e.g. with the matrix 92E and cells 94E integrally formed by the molding process. After injection molding, a filter media 50E is added to the matrix 92E, for example by filling at least some, alternatively all, cells 94E with a granulate, particulate, or pelletized filter media. Mesh (not shown) can be disposed on the upper and lower sides of the frame 96 to cover the matrix 92E and contain the filter media 50E within the matrix 92E. It is noted that in FIG. 17, only a portion of filter media 50E is shown for illustration purposes. The filter media 50E is not depicted in FIG. 18 for clarity.

Figure 19:
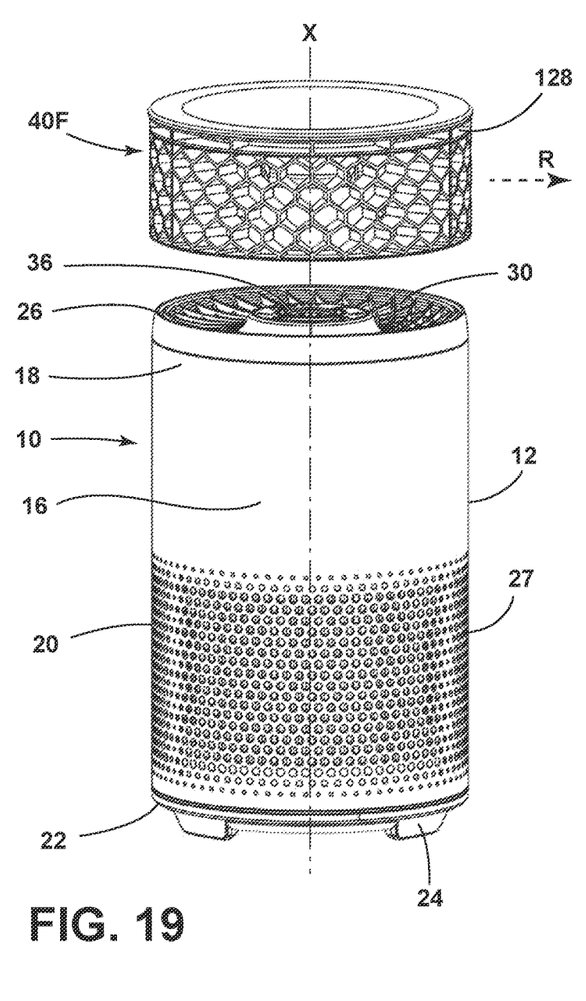
FIG. 19 is a perspective view of the air purifier from FIG. 1-2, with an air purifier accessory according to still a further aspect of the disclosure, and with the air purifier accessory exploded from the housing of the air purifier.
Figure 20:
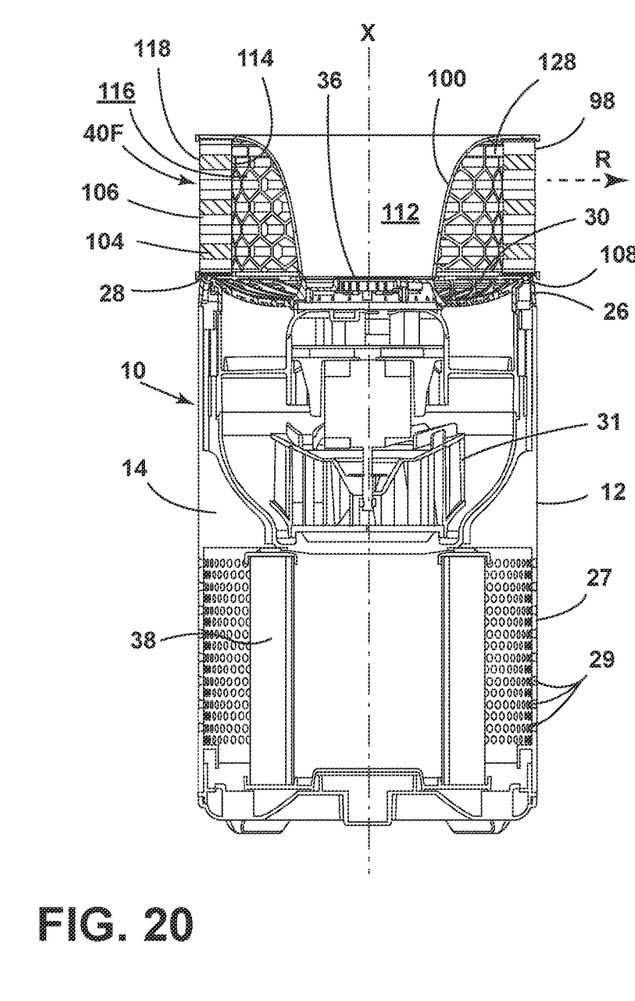
FIG. 20 is a cross-sectional view through the air purifier and accessory of FIG. 19, with the accessory installed on the air purifier.

FIGS. 19-22 show the air purifier 10 including an air purifier accessory 40F according to another aspect of the disclosure. Like elements are referred to with the same reference numeral bearing a letter "F." Like previous embodiments, the accessory 40F is disposed on the housing 12 to filter, clean, and/or purify air flowing out of the air 30. However, rather than flowing axially out of the accessory 40F, air flows radially out of the accessory 40F. For example, referring to FIG. 1, air flowing out of air outlet 30 in a generally axial direction relative to the longitudinal axis X of the housing 12 passes out of the accessory 40 in substantially the same generally axial direction. Referring to FIG. 19, air passes out of the accessory 40F in a generally radial direction R relative to the axis X of housing 12 or an axis of the accessory 40F, which may, in some embodiments, be collinear with axis X. In being "generally axial," the direction can deviate up to 5 degrees from axis X, alternatively up to 10 degrees, alternatively up to 20 degrees. In being "generally radial," the direction is about 90 degrees from axis X, alternatively 90±5 degrees, alternatively 90±10 degrees, alternatively 90±20 degrees.

Figure 21:
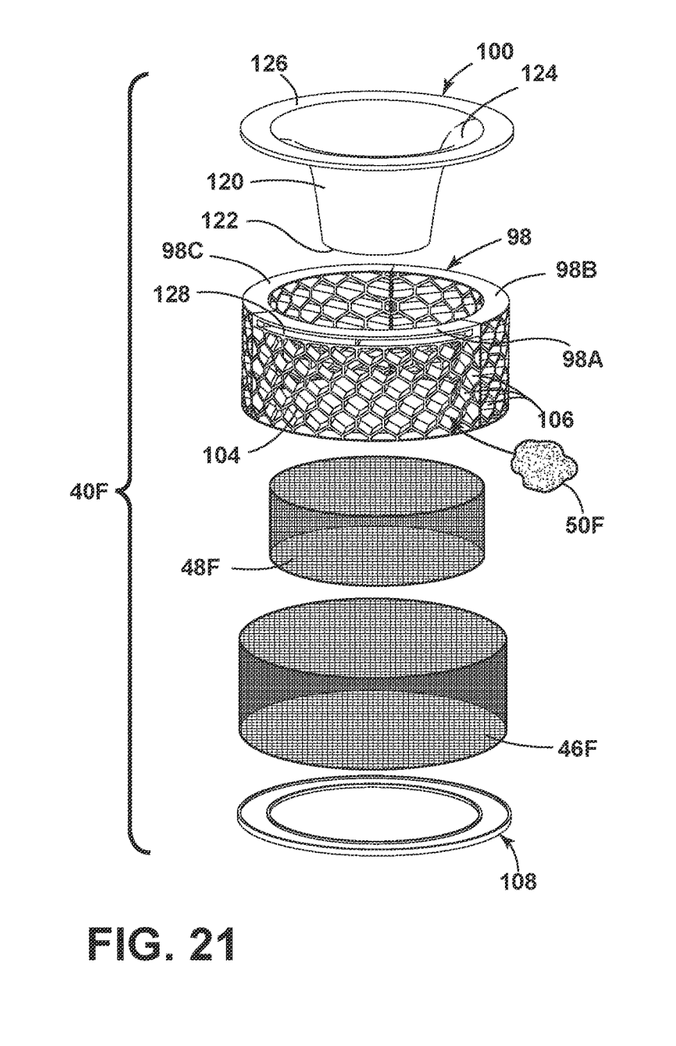
FIG. 21 is an exploded view of the air purifier accessory of FIG. 19.
Figure 22:
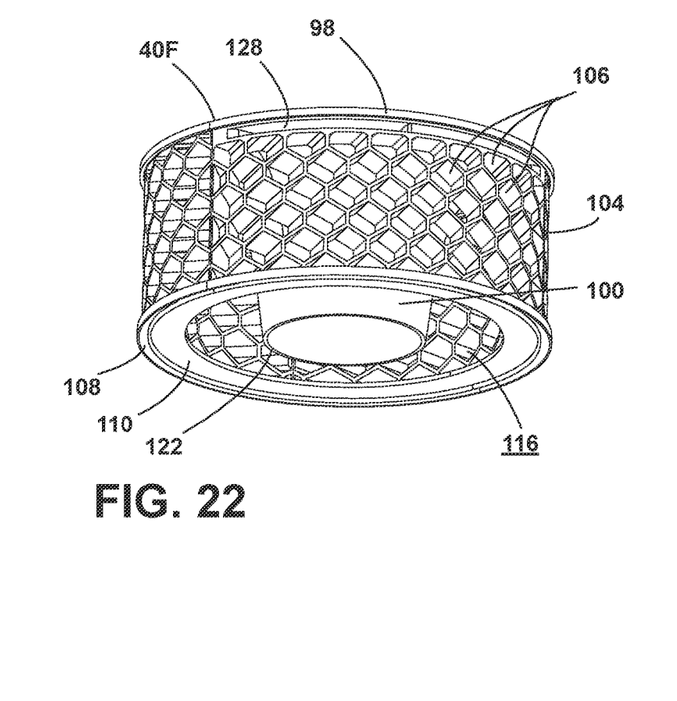
FIG. 22 is a bottom perspective view of the air purifier accessory of FIG. 19.

Referring additionally to FIGS. 21-22, the accessory 40F includes a frame 98 holding a filter media 50F and an air deflector 100. The frame 98 can include an annular body formed by a filter media matrix 104 defining a plurality of cells 106. The filter media 50F can be disposed in at least some, alternatively all, of the cells 106. Mesh 46F, 48F can be disposed on the outer and inner sides of the matrix 104 to contain the filter media 50 within the matrix 104. It is noted that in FIG. 21, only a portion of filter media 50F is shown for illustration purposes. The mesh 46F, 48F is not depicted in FIGS. 19-20 and 22 for clarity.

In one embodiment, the matrix 104 can have a honeycomb configuration, with the cells 106 having a hexagonal shape. Other configurations for the matrix 104 and shape for the cells 106 are possible. The cells 106 can be oriented on an angle as shown, e.g. which can simplify manufacturing in the case of an injection-molded frame 98. In other embodiments, the cells 106 can be orientated radially, upwardly, downwardly, or a combination thereof.

It is noted that the configuration of the flow diverters of the outlet of the air purifier 10 can, in one embodiment, create a vortex-like flow of air, and the shape of the matrix 104 can be configured to follow the vortex-like flow of air, for example with the cells 106 arranged in a spiral pattern and individual cells 106 pointing upward. The plurality of cells 106 can be generally uniform in size, shape, and/or orientation, or may have a variety of sizes, shapes, and/or orientation.

Optionally, the accessory 40F can include a base ring 108 on a bottom side of the frame 98. The base ring 108 is used to install the accessory 40F on the air purifier 10, and can include or more physical features for aligning the accessory 40F on the air purifier 10. In one embodiment, the base ring 108 includes a groove 110 (FIG. 22) that fits over the lip or ledge 28 in the top portion 26 to nest the accessory 40F on top of the air purifier 10. Other physical features for aligning the accessory 40F on the air purifier 10 are possible.

The air deflector 100 is primarily disposed within the interior of the frame 98 and defines a closed area 112 in which air does not flow. The air deflector 100 is spaced from an inner side 114 of the matrix 104 to define an open area 116, which can extend circumferentially around the air deflector 100. The air exiting the air purifier 10 flows into the open area 116 between the air deflector 100 and the inner side 114 of the matrix 104, passes through the cells 106, and then out of an outer side 118 of the matrix 104.

The accessory 40F includes at least one air inlet 150 on an inflow side 152 of the frame 98 and at least one air outlet 154 on an outflow side 156 of the frame 98. In the embodiment of FIGS. 19-22, the accessory 40F has an air inlet 150 formed on a lower side of the frame 98, the lower side defining the inflow side 152. The accessory 40D includes a plurality of air outlets 154 on the outflow side 156 of the frame 98, and the outer side 118 of the matrix 104 can form the outflow side 156.

The air deflector 100 is configured to deflect the air to be filtered as it flows through the frame 98, with air flowing through the open area 116. Air exiting the air purifier 10 flows axially into the open area 116 through the inflow side 152 of the frame 98 and flows radially out of the open area 116 through the outflow side 156 of the frame 98.

In one embodiment, the air deflector 100 is defined by a trumpeted center section 120. The trumpeted center section 120 has a lower end 122 and an upper end 124, where the upper end 124 has a larger diameter than the lower end 122. This provides the open area 116 with a larger cross-sectional area at the lower end of the air deflector 100 and a smaller cross-sectional area at the upper end of the air deflector 100. The upper end 124 can include a flange 126 disposed on a top side of the frame 98, with the trumpeted center section 122 extending downward from the top side into the interior of the annular body 102. The trumpeted center section 120 is closed to air flow, such that air that enters the open area 116 flows out through the frame 98.

The lower end 122 of the air deflector 100 can define the air inlet 150 on an outer side thereof. The air inlet 150 can, for example, be formed by the open space between the lower end 122 and the base ring 108, as best seen in FIG. 22. The air inlet 150 can extend circumferentially around the lower end 122 of the air deflector 100. In other embodiments, the air inlet 150 can extend less than the entire circumference of the air deflector 100 and/or multiple air inlets can be provided.

The presence of the air deflector 100 can affect the speed of air as it passes through the accessory 40F. In particular, air moves faster near the surface of the air deflector 100 than it does farther away from the air deflector 100. With a trumpeted shape, air speed is higher at the upper end 124 than at the lower end 122.

The interior of the air deflector 100 can be hollow to provide access to a user interface UI 36 of the air purifier 10. The lower end 122 can have an opening sized to fit around the user interface, such that a center area of the accessory 40F is clear and the user interface is accessible when the accessory 40F is present on the air purifier 10.

Optionally, the accessory 40F can include at least one bypass outlet that allows air exiting the air purifier 10 (FIG. 1) to bypass the filter media 50F so as to not suffocate the air purifier 10. In the embodiment shown, multiple bypass outlets 128 are provided in the frame 98 and are disposed about the circumference of the frame 98.

The cells 106 and bypass outlets 128 can collectively define the outlet area through which air can leave the accessory 40. The bypass outlets 128 define a small percentage of the outlet area, with the cells 106 defining a much larger percentage of the outlet area. Accordingly, the majority of air that enters the open area 116 flows out of the air purifier 10 through filtration media 50F via the cells 106, while a minority bypasses the filtration media 50F via the bypass outlets 128.

Various configurations for the bypass outlets 128 are possible. In one embodiment, the bypass outlets 128 can comprise narrow slits in the frame 98. The slits can be elongated horizontally, and are relatively short vertically.

The bypass outlets 128 may preferably be disposed at the upper end of the frame 98, where airflow velocity is highest due to the trumpeted shape of the air deflector 100. For example, the bypass outlets 128 can be disposed close to the surface of the deflector 100, at the wider upper end 124. The bypass outlets 128 can be above the matrix 104 and below the top side of the frame 98. Other locations for the bypass outlets 128 are possible.

The frame 98 may be a plastic component manufactured via injection molding, e.g. with the matrix 104 and cells 106, and optionally the bypass channels 128 integrally formed by the molding process. After injection molding, a filter media 50F is added to the matrix 104, for example by filling at least some, alternatively all, cells 106 with a granulate, particulate, or pelletized filter media. Mesh 46F, 48F (FIG. 21) can contain the granulate, particulate, or pelletized filter media within the matrix 104. Before or after adding the filter media 50F, the air deflector 100 and optional base ring 108 are assembled on the frame 98.

The frame 98 may define the longitudinal axis X of the accessory 40F, with the axis X extending though the open center of the frame 98. The axis X may also extending through the open center of the air deflector 100.

In some embodiments, the frame 98 can be formed in multiple pieces and assembled together in an annular ring shape as shown. To assemble the pieces of the frame 98, the air deflector 100, and the base ring 108, a suitable joining method such as adhesion, gluing, bonding, welding, and the like, is used. In one example, as shown in FIG. 21, the frame 98 is formed in three sections 98A, 98B, 98C.

With a multi-piece frame, each section 98A, 98B, 98C can be filled, or partially filled, with filter media 50F before assembling the sections together, which can result in a greater volume of filter media 50F in the frame 98. Each section 98A, 98B, 98C, which a section of outer mesh 46F applied, can be laid on its outer side, filled with filter media 50F, and then closed by a section of inner mesh 48F. The filled sections 98A, 98B, 98C are then assembled together to complete the annular frame 98. The air deflector 100 can be installed through the top side of the frame 98 and attached to the upper edge thereof.

Figure 23:
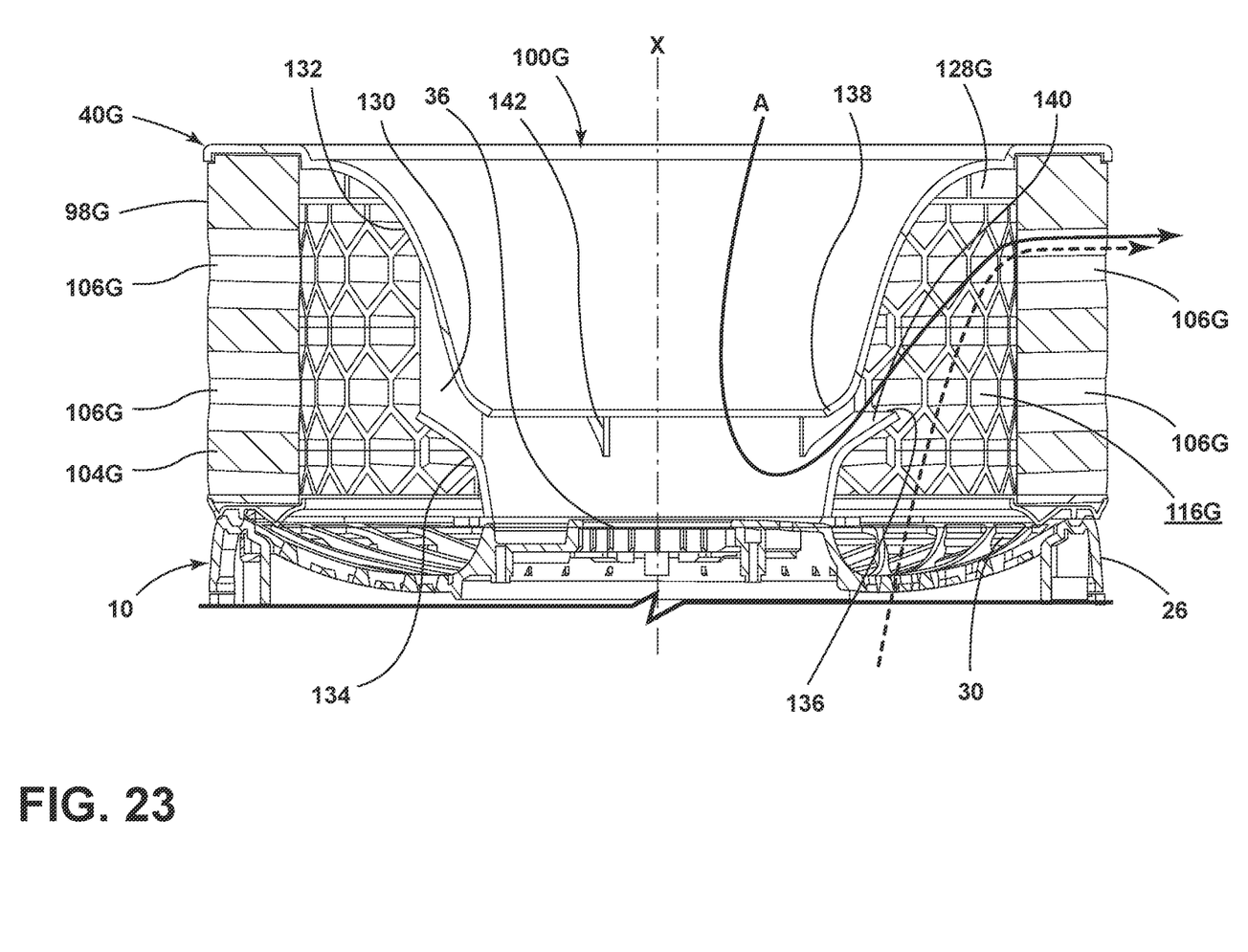
FIG. 23 is a cross-sectional view through an upper portion of the air purifier from FIG. 1-2, with an air purifier accessory according to a further aspect of the disclosure.

FIG. 23 show the air purifier 10 including an air purifier accessory 40G according to another aspect of the disclosure. The accessory 40G is substantially similar to the accessory 40F of FIGS. 19-22, and like elements are referred to with the same reference numeral bearing a letter "G." The accessory 40G differs in that, rather than being closed to air flow, the air deflector 100G has at least one open area 130 through which ambient air A, which has not passed through the air purifier 10, can enter the accessory 40G and be filtered, providing additional odor control.

Various configurations for the open area 130 are possible. In one embodiment, the air deflector includes an upper section 132 and a lower section 134, and the open area 130 is defined between the upper and lower sections 132, 134. The lower section 134 can have a top edge 136 that flares outwardly beyond a lower edge 138 of the upper section 132 to create a gap 140 through which air can pass. The gap 140 can extend substantially around a circumference of the air deflector 100G. Ribs 142 can connect the upper and lower sections 132, 134 together and can cross the gap 140.

The air deflector 100G may be a plastic component manufactured via injection molding, e.g. with the upper and lower sections 132, 134 integrally formed by the molding process. In another embodiment, the air deflector 100G be formed in multiple pieces and assembled together.

During operation of the air purifier 10, high velocity air moving on the outside of the air deflector 100G creates a negative pressure zone, which sucks ambient air A down through the open area 130 in the deflector 100G. The ambient air A flows through the open area 130 between the upper and lower sections 132, 134 of the air deflector 100G and is filtered by passing through filtration material 50G via the cells 106.

In other embodiments, the open area 130 can be provided in various other locations and configurations on the air deflector 100G. For example, the open area 130 can be formed as a plurality of perforations, slots, or other apertures in the deflector 100.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular.

What is claimed is:

1. An air purifier assembly, comprising:
   an air purifier comprising:
      a housing having a longitudinal axis;
      an air flow path through the housing including an air inlet and an air outlet;
      a blower disposed within the housing, the blower defining a portion of the air flow path and adapted to pull air in through the air inlet and to push air out of the air outlet; and
      an air treatment device disposed within the housing to treat air flowing through the air flow path;
   an air purifier accessory disposed on the air outlet, outside of the housing, to treat air flowing out of the air outlet, the air purifier accessory comprising:
      a frame;
      a filter media within the frame for filtering air discharged from the air purifier;
      at least one air inlet on an inflow side of the frame;
      a plurality of air outlets on an outflow side of the frame, wherein the outflow side of the frame is perpendicular to the inflow side of the frame; and
      an air deflector configured to deflect the air to be filtered as it flows through the frame, the air deflector defining a closed area within the frame in which air does not flow and an open area within the frame in which air flows;
      wherein air exiting the air purifier flows axially into the open area through the inflow side of the frame and flows radially out of the open area through the outflow side of the frame.

2. The air purifier assembly of claim 1, wherein the housing defines a lower portion and an upper portion, the lower portion adapted to rest on a surface, wherein the air outlet is formed in the upper portion of the housing and the air purifier accessory is adapted to rest on the upper portion of the housing to cover the air outlet.

3. The air purifier assembly of claim 1, wherein the housing comprises a cylindrical body and the air purifier accessory comprises an annular body formed by a filter media matrix defining a plurality of cells, wherein the filter media is disposed in at least some of the plurality of cells.

4. The air purifier assembly of claim 3, wherein the air deflector is spaced from an inner side of the filter media matrix to define the open area, wherein the air exiting the air purifier flows into the open area between the air deflector and the inner side of the filter media matrix.

5. The air purifier assembly of claim 3, wherein the filter media matrix comprises a honeycomb configuration and the plurality of cells comprise a hexagonal shape.

6. The air purifier assembly of claim 1, wherein the air purifier comprises a user interface, and the air purifier accessory comprises an access opening to allow access to the user interface, wherein the air deflector defines the access opening.

7. The air purifier assembly of claim 1, wherein the air purifier accessory comprises at least one bypass outlet provided in the frame, wherein the bypass outlet allows air discharged from the air purifier to bypass the filter media.

8. The air purifier assembly of claim 7, wherein the air deflector comprises a trumpeted center section having a lower end and an upper end, where the upper end has a larger diameter than the lower end, and wherein the at least one bypass outlet is disposed at an upper end of the frame.

9. The air purifier assembly of claim 7, wherein the air deflector includes an upper end and a lower end, and wherein the open area has a larger cross-sectional area at the lower end of the air deflector and a smaller cross-sectional area at the upper end of the air deflector, wherein the at least one bypass outlet is disposed at the upper end of the air deflector.

10. An air purifier accessory, comprising:
   a frame adapted to be coupled to an exterior of an air purifier and defining an longitudinal axis;
   a filter media within the frame for filtering air discharged from the air purifier;
   at least one air inlet on an inflow side of the frame;
   a plurality of air outlets on an outflow side of the frame, wherein the outflow side of the frame is perpendicular to the inflow side of the frame; and
   an air deflector configured to deflect the air to be filtered as it flows through the frame, the air deflector defining an open area within the frame in which air flows;

wherein air exiting the air purifier flows axially into the open area through the inflow side of the frame and flows radially out of the open area through the outflow side of the frame.

11. The air purifier accessory of claim 10, wherein the frame comprises an annular body formed by a filter media matrix defining a plurality of cells, wherein the filter media is disposed in at least some of the plurality of cells.

12. The air purifier accessory of claim 11, comprising a mesh disposed on at least a portion of the filter media matrix to contain the filter media in the filter media matrix.

13. The air purifier accessory of claim 11, wherein the filter media matrix comprises a honeycomb configuration and the plurality of cells comprise a hexagonal shape.

14. The air purifier accessory of claim 11, wherein the air deflector is spaced from an inner side of the filter media matrix to define the open area, wherein the air exiting the air purifier flows into the open area between the air deflector and the inner side of the filter media matrix.

15. The air purifier accessory of claim 10, wherein the air deflector comprises a trumpeted center section having a lower end and an upper end, where the upper end has a larger diameter than the lower end.

16. The air purifier accessory of claim 15, wherein the upper end comprises a flange disposed on a top side of the frame, with the trumpeted center section extending downward from the top side into an interior of the frame.

17. The air purifier accessory of claim 10, wherein the air deflector comprises a lower end and an upper end, and wherein the open area comprises a first cross-sectional area at the lower end of the air deflector and a second, smaller cross-sectional area at the upper end of the air deflector.

18. The air purifier accessory of claim 10, comprising at least one bypass outlet provided in the frame, wherein the bypass outlet allows air discharged from the air purifier to bypass the filter media.

19. The air purifier accessory of claim 18, wherein the air deflector comprises a trumpeted center section having a lower end and an upper end, where the upper end has a larger diameter than the lower end, and wherein the at least one bypass outlet is disposed at an upper end of the frame.

20. The air purifier accessory of claim 10, wherein the air deflector includes an upper section and a lower section, and the open area is defined between the upper and lower sections.

21. The air purifier accessory of claim 20, wherein the lower section comprises a top edge that flares outwardly beyond a lower edge of the upper section to create a gap through which air can pass.

* * * * *